July 19, 1938.  W. E. SPARLING ET AL  2,123,917
OVERHEAD TRAVELING CONVEYER
Filed April 20, 1935   2 Sheets-Sheet 1

Inventors
Wyndham Earle Sparling
Raymond Kolbe Wilson
By C. J. Stockman
Attorney July 19, 1938. W. E. SPARLING ET AL 2,123,917
OVERHEAD TRAVELING CONVEYER
Filed April 20, 1935   2 Sheets-Sheet 2
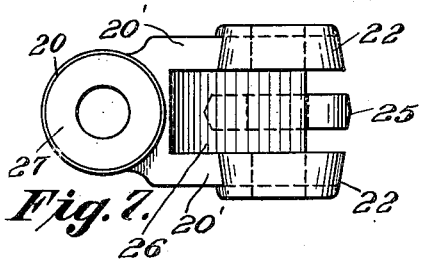
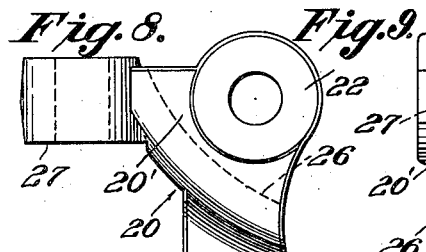
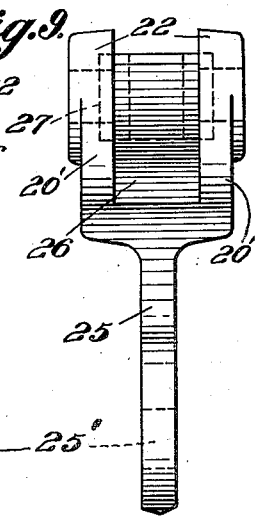
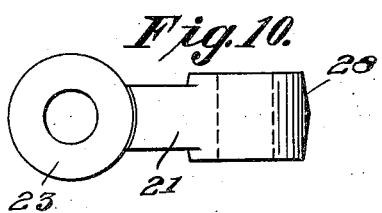
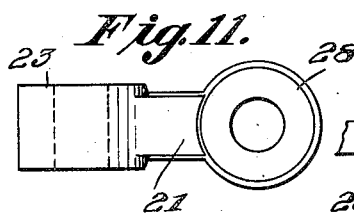
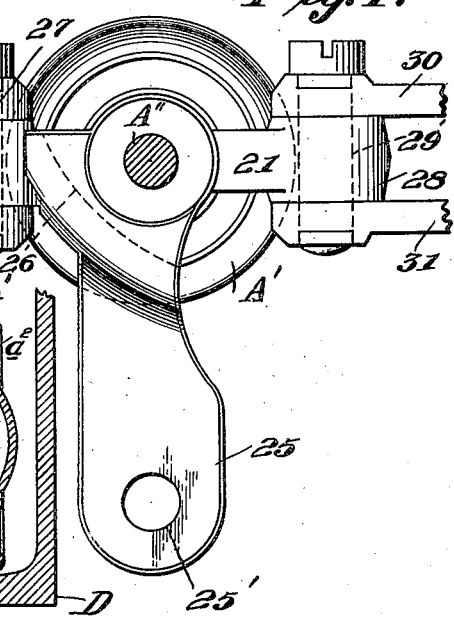
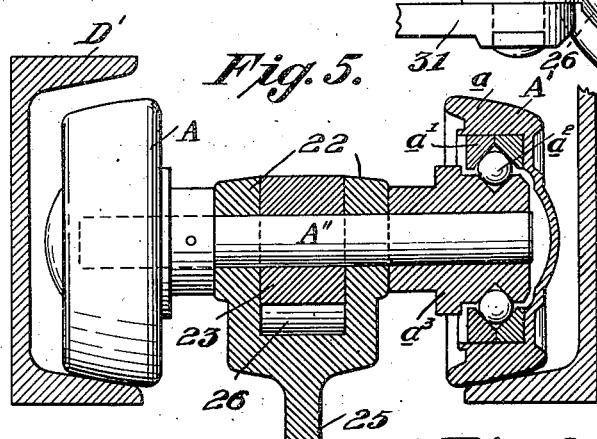
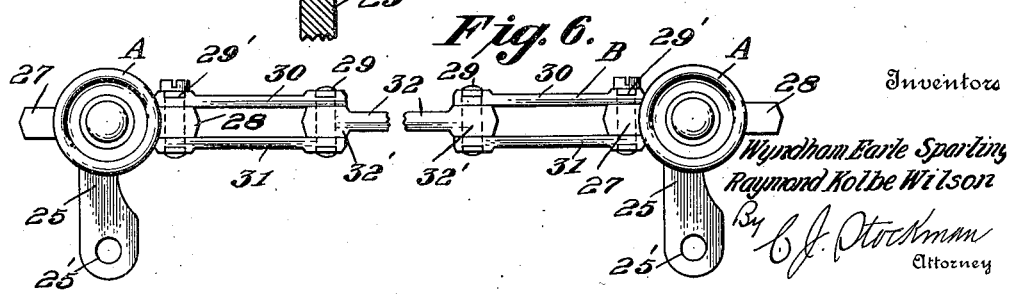

Patented July 19, 1938

2,123,917

UNITED STATES PATENT OFFICE 2,123,917

OVERHEAD TRAVELING CONVEYER

Wyndham Earle Sparling and Raymond Kolbe Wilson, Cincinnati, Ohio, assignors to The Alvey-Ferguson Company, Oakley, Cincinnati, Ohio, a corporation of Ohio Application April 20, 1935, Serial No. 17,524

19 Claims. (Cl. 198—177)

This invention relates to overhead traveling conveyers comprising wheeled trolleys or carriages, endless power chains for transmitting movement to said trolleys or carriages, downwardly extending members to which the loads are connected, sprocket wheels suitably arranged with relation to the chains to transmit movement thereto and to guide the same around bends and suitable tracks for supporting and guiding the trolleys or carriages in the travel of the latter.

The invention particularly relates to a simplified and very practicable relative arrangement of the chain and trolleys or carriages, the said arrangement being characterized, in part, by direct pivotal connection of a pair of complementary links of the chain with the wheel axle or spindle of the corresponding trolley or carriage and further by the utilization of a chain whose links are connected with each other by vertical and horizontal pivots to adapt the chain to bend horizontally and vertically, together with sprocket wheels whose teeth are formed to accommodate the wheels of the trolleys or carriages and to be engaged by the links of the chain. The portions of each pair of complementary links which have direct pivotal connection with the corresponding wheel axle have an overlapping relation, one to the other.

The invention is further characterized by a special construction of the teeth of each sprocket wheel to be engaged by the chain at the places where the direction of movement and hence of the trolleys or carriages is to be changed and still further, by the provision of supporting and guiding means which co-act in taking the weight of the trolleys or carriages and of the loads carried by the latter, from the sprocket wheels and sprocket teeth while at the same time assuring effective engagement of the chain with said sprocket teeth in passing around the outer sides of said sprocket wheels.

In a general way, it may be stated that a conveyer having the characteristic features hereinbefore referred to is far more compact than overhead conveyers of the previous type, allows the load carrying elements of the trolleys or carriages to be attached closer to the center line of the chain, increases head room, reduces the distance from the center line of the chain to the center of the hole in the load carrying attachments, and reduces the power requirements by causing the chain to run smoothly regardless of any change in its direction of movement, either horizontally or vertically.

In the accompanying drawings illustrating the preferred embodiment of the invention:

Fig. 4 is a detail view in side elevation of a trolley or carriage and contiguous portions of the chain, with the trolley axle in section and the inner wheel of the trolley or carriage removed;

Fig. 5 is a view, mainly in section, of a trolley or carriage together with the rail members for supporting and guiding the same in its travel to or away from a sprocket wheel and together also with the corresponding links of the driving chain;

Fig. 6 is a side elevation showing two of the trolleys or carriages and contiguous portions of the driving chain;

Fig. 7 is a plan view, Fig. 8 is a side elevation and Fig. 9 an end elevation of one of the two complementary links by which the driving chain is connected to the corresponding trolley or carriage to drive the latter; and Figs. 10 and 11 are, respectively, a plan view and a side elevation of the other of said complementary links.

Figure 1:
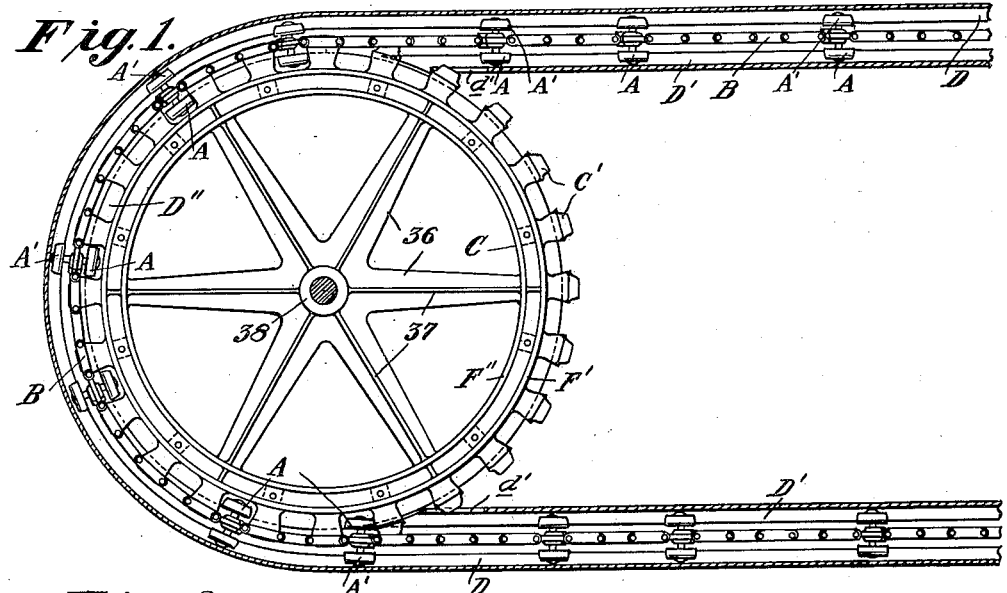
Fig. 1 is a plan view of a portion of the conveyer adjacent one of the sprocket wheels and shows certain of the supporting and guiding rails in section taken on a horizontal plane below the upper flanges of said rails, to disclose said wheels.

In Fig. 1: A and A' respectively designate the supporting wheels at opposite sides of each of a plurality of frameless trolleys or carriages, hereinafter, for the sake of brevity, entitled "trolleys"; B designates the chain which communicates traveling movement to said trolleys; and C designates one of the sprocket wheels. The trolleys are arranged, as usual, at appropriate distances apart along the length of the chain B and are moved along a defined course of travel between and around the outer sides of the several sprocket wheels included in the system upon appropriate rails D, D' and D'' by said chain, it being understood that the chain in practice is driven by power means which includes a driving sprocket wheel engaged with the chain and that idler sprocket wheels are positioned along the length of the chain wherever necessary to support the latter and/or in the places where the chain changes its course of travel. It will also be understood that the extent and the course of travel of the trolleys vary in different installations, being determined by the particular needs in respect of any given installation, and hence, that the chain and rails may be of any suitable length and may extend along a straight or a circuitous course and either upwardly or downwardly as required by the course of travel to be given the trolleys. The sprocket wheel C may be either a driving or a driven sprocket wheel.

Each trolley is preferably of the type which comprises two carrying wheels A and A' rotatably mounted upon the opposite ends of a wheel supporting member provided by a shaft or axle A'' which extends continuously across the trolley from one wheel to the other; and each wheel (see Fig. 5) comprises an outer or rim-member $a$ having, fixed to its inner circumference, an outer bearing member $a^1$ which is rotatably mounted upon friction-reducing members $a^2$ interposed between said outer bearing member and an inner bearing member $a^3$ fixedly secured to the wheel supporting member A''.

The chain B, presently described in detail, is of endless nature and is of the type comprising suitable links and vertical and horizontal pivots relatively arranged to adapt the chain to have bending movements in planes perpendicular to each other, that is, about vertical axes and about horizontal axes, and, as already stated, the chain, according to the present invention, is characterized by the inclusion at each of the several places at which a trolley is connected thereto of a pair of complementary links having overlapping ends both pivoted directly on the wheel supporting member A'' of the corresponding trolley. In other words, the relative arrangement of each pair of complementary links and the corresponding trolley is such that there is no hanger or similar device interposed between the chain and the wheel supporting member of the trolley. Moreover, one of the said complementary links of each pair is formed with a member (as will be presently fully described) which extends downward therefrom and to which the load is connected, either directly or indirectly, so that the weight of the load is transferred directly through said link to said wheel supporting member.

One link of each of said pairs, in the illustrated embodiment of the invention, is formed to provide two arms 20', 20' which are spaced from each other to receive the contiguous end of the complementary link 21 between them, said links thereby having a female and male relationship one with the other. The arms 20' of the female link are formed with bosses 22, as clearly shown in Figs. 7, 8 and 9, and the corresponding end of the link 21 is similarly formed with a boss 23, as shown in Figs. 10 and 11. The openings in these bosses 22 and 23 register with each other when the links are assembled and the wheel supporting member A'' extends through these openings with sufficient looseness to permit the links to turn pivotally upon said member. These links are arranged between the wheels A and A' of the trolley and are held against movement longitudinally of the member A'' by their engagement with the flanged ends of the inner bearing members $a^3$ which, as shown, extend outward beyond the corresponding surfaces of said wheels, respectively.

Integral with the bottom of each female link is the downwardly projecting member 25, hereinbefore referred to as being for the connection of the load to said link. Said member is shown as having an opening 25', which is to receive a hook or other means which forms a part of a hanger, carrier or other means (not shown) by which the load is suspended from the member A'' of the trolley through the medium of the female link 20 and the member 25 which forms an integral part of said link.

One surface 26 of each female link between the arms 20' is solid and arcuate to give strength to the link and to permit it to have pivotal movement about a horizontal axis on the member A'' and it is from the lower part of this surface and about midway between the arms 20' that the member 25 projects. In other words, this link is open at its top and front, and is closed at its bottom and back by a concave wall surface 26, which extends across it from one of its side arms 20' to the other and between said side arms is formed integral with a depending load carrying member 25 which extends downward therefrom. Its construction, therefore, adapts it to be easily and quickly assembled with the corresponding link 21 and the trolley, does not interfere with its pivotal movement and is sufficiently strong to enable it to support the load, all without any waste of material in its formation.

The female link is also formed at its end opposite the bosses 22 with another boss, 27, whole opening is at right angles with those in the said bosses 22, and, similarly, the male link 21 is formed with a boss 28 whose opening is at right angles with the opening through its boss 23.

Referring now to Fig. 6, it will be seen that there are a plurality of intermediate chain links connected with each other by vertical pivots 29 and with the male and female links by vertical pivots 29'. There may be any number of these intermediate links appropriate to any given installation. As here shown, they are of two different styles arranged alternately. The links of one style are open at the sides, being formed of two bars 30 and 31 arranged flatwise and one above the other, with a space between them to receive the outer end portions $c^1$ of the sprocket teeth C'. The ends of the spaces between the upper and lower bars 30, 31 of each two successive links of the described laterally open style are closed by bosses 32' formed at the opposite ends of an intermediate link 32, the upper and lower surfaces of said bosses forming seats engaged by the ends of said bars 30, 31. The pivots 29 extend through the ends of the bars 30, 31 and through the bosses 32' and are held against displacement by suitable means. It will be noticed that the pair of link bars 30, 31 on opposite sides of each trolley are connected to the male and female links by pivots 29' which extend through said bars and through the bosses 28 and 27 of said male and female links, respectively. It will also be noticed that bosses are arranged at the ends of all the links and that these bosses not only close the ends of the links but, furthermore, are the elements of the links which engage the sides of the outer end parts $c^1$ of the sprocket teeth C'.

Figure 2:
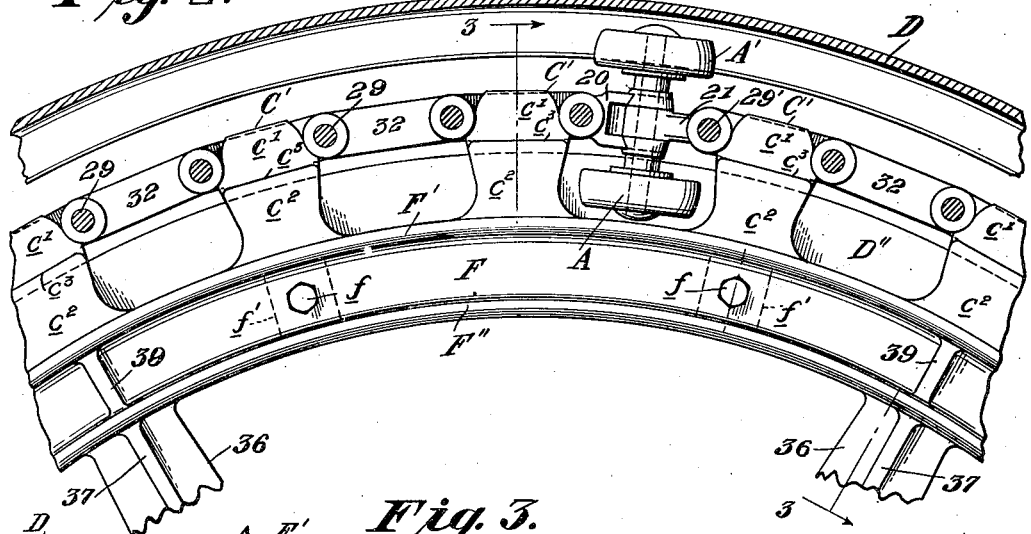
Fig. 2 is an enlarged plan view of a part of the outer rim and the corresponding teeth of a sprocket wheel and of the corresponding part of the chain and a trolley or carriage engaged with said teeth, this view also showing the corresponding parts of the outer and inner rails, the former in section on a horizontal plane below its upper flange.

These sprocket teeth C', as shown in Figs. 1 and 2, are of special formation, each including an outer member $c^1$, an inner or base member $c^2$ and shoulders $c^3$ on its opposite sides at the junction of its said members $c^1$ and $c^2$. The outer members $c^1$ of successive teeth are spaced from each other a distance corresponding to the length of the openings in the chain and project into said openings and have their front and rear surfaces of a shape corresponding to the shape of the bosses 27, 28 and 32' which they engage in transmitting movement to or in receiving movement from the chain. The relative shapes of the surfaces of the bosses and said outer members $c^1$ of the sprocket teeth are also such, as shown, as to provide for an effective engagement and disengagement thereof at appropriate places in the rotative movement of the sprocket wheel. The inner or base members $c^2$ of said sprocket teeth are joined to the outer surface of the wheel rim and are spaced from each other and formed to provide openings to receive the supporting wheels A of the trolleys, and the shoulders $c^3$ provide rests for the bars 30 and 31 of the chain links, as shown best in Fig. 3.

The outer rail D and also the inner rail D' are arranged to be engaged by the wheels A' and A respectively of each trolley and in practice extend from each sprocket wheel to the next in succession, the said outer rail also extending around the outer half of the sprocket wheels in a position in which it has a supporting and guiding relation with the trolley wheels A' throughout the travel of the trolleys around the sprocket wheel (as well as between the sprocket wheels) and the said inner rail substantially terminates near to but short of the sprocket wheels, as shown in Fig. 1 and in such relation to the teeth of the sprocket wheel and the rail D'' that the trolley wheels A will move automatically and smoothly from the rail D' to the rail D'' in passing to the sprocket wheel and from the rail D'' to the rail D' in passing from the sprocket wheel. Each of the rails D and D' is preferably formed with upper and lower flanges and a web connecting said flanges with each other, as indicated in Fig. 5 and said rail D' is preferably formed with openings $d'$ adjacent the sprockets to permit the free passage of the wheels A from or to said rail.

The wheels A which are arranged between the teeth of the sprocket wheel are supported by the rail D''. This rail D'' is carried by and moves with the sprocket wheel and it is so correlated, as previously suggested, with the teeth and rails D' that the trolleys will move smoothly into engagement with it from one rail D' and move smoothly from it into engagement with the other rail D' at corresponding places in the travel of the trolleys with the sprocket wheel and rail D''.

Figure 3:
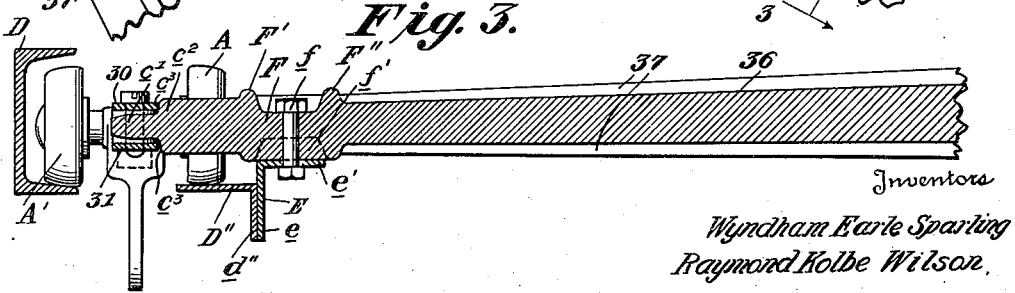
Fig. 3 is a vertical section of the irregular line 3—3 of Fig. 2.

As shown in Fig. 3, this rail D'' is of angular cross section and is connected to the corresponding side of the sprocket wheel through the medium of a bracket E, similarly of angular cross section, and to one member $e$ of which its member $d''$ is welded or otherwise suitably secured. The other member, $e'$, of said bracket is secured by bolts $f$ to lugs $f'$ projecting from the face of the web F forming part of the wheel rim. This web F is formed between two rings F' and F'' from one of which (F') the teeth of the sprocket wheel projects.

Otherwise than as above described, the sprocket wheel C may be of any suitable construction, but, as here shown, comprises a series of spokes 36, each having a reenforcing rib 37 extending longitudinally along its opposite sides from a central or hub portion 38 of the wheel to the ring or flange F''. These rings or flanges, as shown in Fig. 3, respectively project laterally beyond the side surfaces of the corresponding spokes and of the member $c^2$ of the sprocket teeth. The web F, in the illustrated embodiment, also is formed with reenforcing ribs 39 which are aligned with the ribs 37.

All of the foregoing parts of the sprocket wheel, except the bracket E and bolts $f$, are preferably of integral construction and co-act in forming a wheel of great durability and of special utility in its relation to a conveyer of the overhead traveling type in which the chain is directly connected to a supporting element for a pair of trolley wheels mounted on opposite ends of said supporting element and is engaged with guiding and supporting elements so correlated therewith as to take the strain which otherwise would be imposed on the sprocket teeth engaged by said chain and trolleys at the places in the layout at which sprocket wheels are provided to drive the chain and thereby impart traveling movement to the trolleys and/or at the places at which the sprocket wheels are to change the course of travel of the chain and trolleys. It will be understood, in practice, and, indeed, it has been hereinbefore suggested, that the lay-out of this conveyer may include places at which the course of travel is varied either horizontally and/or vertically and, accordingly, it will be understood that at those places at which the course of travel is to be varied in a vertical direction the sprocket wheels at such places should be arranged to rotate about horizontal axes and the teeth of said sprocket wheels should engage links which are open at the top and bottom, instead of at the sides. It will be apparent that the links 32 may be of a construction to permit this.

It will also be understood that many changes in the details of the illustrated embodiment of the invention may be made without departure from the scope of appended claims and, furthermore, that the invention may be employed in the carrying of various kinds of articles and throughout various courses of travel appropriate to given installations. It may be employed in, but is not confined to, systems in which the articles carried by the conveyer are subjected to different steps of treatment while engaged with the conveyer, the conveyer lending itself to whatever changes in its course of travel of the load are required in accord with the steps of treatment to which it is to be subjected and in the interim between said steps.

Having thus described the invention what we believe to be new and desire to secure by Letters Patent, is:—

1. An overhead traveling conveyer comprising a pair of supporting wheels, a member upon which said wheels are rotatably mounted and an endless traveling chain for imparting traveling movement to said wheel and member, said chain having links to engage an appropriate sprocket wheel and also including a pair of links having overlapping ends pivotally mounted on said member, one of said links having a downwardly extending part substantially in the plane of the axis of the supporting wheel to which the load is to be connected and located between the planes of the wheels, whereby the weight of the load is transmitted by the latter link directly to the member upon which said supporting wheel is mounted.

2. An overhead traveling conveyer according to claim 1, in which the link having the downwardly extending part comprises two spaced side arms and a bottom closure which connects said arms with each other and from which said part extends downwardly.

3. An overhead traveling conveyer according to claim 1, in which the link having the downwardly extending part comprises two spaced side arms and an arcuate transverse wall which closes one end and the bottom of the link and from the undersurface of which said part extends downwardly.

4. An overhead traveling conveyer comprising a pair of trolley-supporting wheels, a member upon which said wheels are rotatably mounted, a sprocket wheel, a chain including links to be engaged by the teeth of said sprocket wheel and a pair of other links having overlapping ends pivotally mounted directly on said member and between said trolley-supporting wheels, said teeth-engaging links having movement about axes perpendicular to the axis of movement of said pair of other links, and one of the latter links having a depending part directly below the first mentioned member to which the load is to be connected.

5. An overhead traveling conveyer comprising a trolley having a pair of supporting wheels and their axle, a driving chain including a pair of complementary links having overlapping ends pivotally mounted on said axle, one of said links having a downwardly extending part located substantially in the vertical plane of the axle and to which the load is to be connected, said chain also including additional links and a sprocket wheel having teeth to engage said additional links and openings which respectively receive the trolley supporting wheels in the passage of the latter and the chain around the sprocket wheel.

6. An overhead traveling conveyer comprising a pair of trolley supporting wheels, a driving chain and a sprocket wheel having teeth whose outer ends extend into links of the driving chain and whose inner ends are spaced to receive one of the trolley supporting wheels between them, said teeth also having lateral shoulders between its said outer and inner ends upon which the corresponding surfaces of the chain-links rest, means adjacent the spaces to support one of the supporting wheels and means adjacent to but separate from the sprocket wheel for supporting the other supporting wheel.

7. An overhead traveling conveyer comprising a trolley having a pair of supporting wheels, a driving chain for said trolley, a sprocket wheel having teeth engaged by said chain and an opening to receive one of said trolley supporting wheels, and a member operatively related to said opening and engageable by one of the trolley supporting wheels and supporting the latter in its travel through the arcuate path traversed by the trolley chain and outer rim of the sprocket wheel, in effecting change of the direction of travel of the chain and trolley and a second member non-rotatively related to the wheel but adjacent thereto to support the other supporting wheel.

8. An overhead traveling conveyer comprising a pair of laterally spaced trolley-supporting wheels, means, including an endless driving chain, for imparting traveling movement to said trolley-supporting wheels, a sprocket wheel having teeth engaged by said chain and an opening to receive one of said trolley-supporting wheels and members spaced from each other and operatively related to said sprocket wheel and chain and respectively engageable by said trolley-supporting wheels in the travel of the latter around the axis of and with the sprocket wheel, to take the strain from the sprocket during such travel, one of the spaced members being rotative with the sprocket wheel and the other being non-rotative.

9. An overhead traveling conveyer comprising a trolley having a pair of supporting wheels, respectively arranged at opposite sides thereof, an endless driving chain for said trolley, a sprocket wheel having teeth to be engaged by said chain, a non-rotating supporting and guiding rail engageable by one of said trolley supporting wheels and extending around the outer half of the sprocket wheel, supporting and guiding rails engageable by the other trolley supporting wheel and substantially terminating short of said sprocket wheel, said sprocket wheel having openings to receive the latter trolley supporting wheel, and means operatively related to said openings and engageable by the latter supporting wheel and supporting the same in its movement from one of the second mentioned rails to the other.

10. An overhead traveling conveyer according to claim 9 in which the last mentioned supporting means is attached to the corresponding side of the sprocket wheel and moves with the trolley wheel and the sprocket wheel.

11. An overhead traveling conveyer comprising a trolley having a pair of supporting wheels and an axle upon whose opposite ends said wheels are rotatably mounted, and an endless traveling driving chain including a pair of links connected directly to said axle, for imparting traveling movement to said trolley, one of the links connected to said axle having a part located substantially in the vertical plane of the axle and which serves to connect the load to said link.

12. An overhead traveling conveyer according to claim 11 in which the link provided with the part by which the load is to be connected thereto comprises two spaced side arms and a bottom closure which connects said arms with each other and from which said part extends in a downward direction.

13. An overhead traveling conveyer comprising a pair of supporting wheels, an axle upon whose opposite ends said wheels are rotatably mounted and an endless traveling driving chain for imparting traveling movement to said wheels and axle, said chain including a pair of links having overlapping ends pivoted directly upon said axle and also including additional links to be engaged by the teeth of a sprocket wheel one of the pair of links having a depending load-carrying member extending vertically below the axle.

14. An overhead traveling conveyer according to claim 13 in which the additional links have pivotal movement about axes which are perpendicular to the axis of the pivotal movement of said pair of links about the axle.

15. An overhead traveling conveyer including a frameless trolley consisting of a pair of supporting wheels arranged at opposite sides thereof and a transverse axle upon whose opposite ends said wheels are rotatably mounted, said conveyor also including an endless traveling driving chain having a pair of links both of which are connected directly to said axle and one of which links is provided with a part located substantially in the vertical plane of the axle and which serves to support the load from the link, and a sprocket wheel having teeth to engage said chain and an opening arranged to receive the trolley supporting wheel at the corresponding side of the trolley in the passage of the chain and trolley around the axis of said sprocket wheel.

16. An overhead traveling conveyer comprising a plurality of trolleys each having a transversely extending axle and a pair of supporting wheels mounted on opposite ends of said axle, an endless traveling driving chain connected directly to the axles of the trolleys and provided with load carrying members respectively arranged substantially directly beneath said axles, and a sprocket wheel having openings to receive the trolley supporting wheels at the corresponding sides of the trolleys and teeth to engage the links between the trolley axles.

17. An overhead traveling conveyer comprising a plurality of frameless trolleys, an endless traveling chain connecting said trolleys with each other and a sprocket wheel having a driving engagement with the said chain; each of said trolleys consisting of a pair of wheels and a transversely extending axle upon whose opposite ends said wheels are rotatably mounted; said endless driving chain having, at spaced intervals corresponding to the positions of the trolleys, a pair of links whose ends overlap and are pivotally mounted directly on the corresponding axles and one link of each of said pairs having a load carrying member arranged substantially in a vertical plane extending through the corresponding axle, said chain also having between its said pairs of links additional links arranged to provide openings to receive the teeth of the sprocket wheel and closed ends to engage the sides of said teeth; and said sprocket wheel having its teeth arranged to provide openings between their bases, which openings receive the wheels at the corresponding sides of the trolleys, the ends of said teeth outward of said bases being arranged to enter and to have driving engagement with said additional links of the chain, the portions of the teeth between their said bases and outer ends being relatively formed to provide shoulders upon which the closed ends of the additional links are seated.

18. An overhead traveling conveyer comprising a plurality of trolleys each having a pair of supporting wheels and a transversely extending axle upon whose opposite ends said wheels are rotatably mounted, an endless traveling driving chain connected directly to said axles at spaced intervals along the length of said chain and provided with means arranged substantially directly beneath the axles for the attachment of loads, and a sprocket wheel for driving said chain, said sprocket wheel and chain respectively having teeth and links relatively formed to provide for driving engagement between the sprocket wheel and chain, and the teeth of said sprocket wheel also having, inward of their link engaging ends, bases relatively arranged to provide spaces to receive the trolley supporting wheels at the corresponding sides of the trolleys.

19. An overhead traveling conveyer comprising a trolley having a pair of supporting wheels mounted at opposite sides thereof, a sprocket wheel having teeth whose inner ends are spaced to provide openings to selectively receive the supporting wheel at the corresponding side of the trolley and whose opposite sides are formed with shoulders which are spaced from the outer and also from the inner ends of the teeth, a driving chain having links which receive the ends of the sprocket teeth outward of said shoulders and rest upon said shoulders, and inner and outer trolley guiding and supporting rails, the outer of which is non-rotative and extends partway around the sprocket wheel and is positioned to be engaged by the outer supporting wheel of the trolley and the inner of which is attached to the sprocket wheel and is positioned to be engaged by the inner supporting wheels of the trolley, said rails co-acting in taking strain of the trolleys and chain from the sprocket teeth in the travel of the former with the said sprocket wheel about the axis of the latter, the chain having a load-carrying element extending between the rails.

WYNDHAM EARLE SPARLING.
RAYMOND KOLBE WILSON.